Jan. 31, 1933. L. EMANUELI 1,895,982
DEVICE FOR REDUCING THE CURRENT IN THE LEAD SHEATHS OF CABLES
Filed Feb. 14, 1930
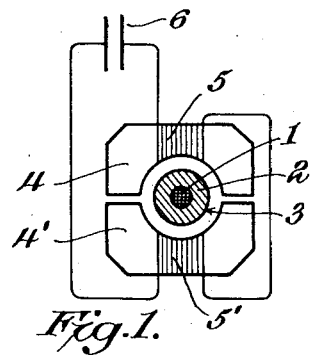
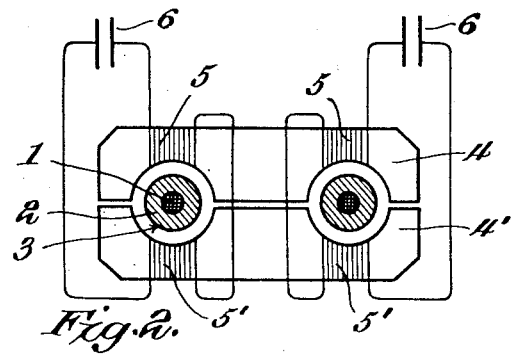
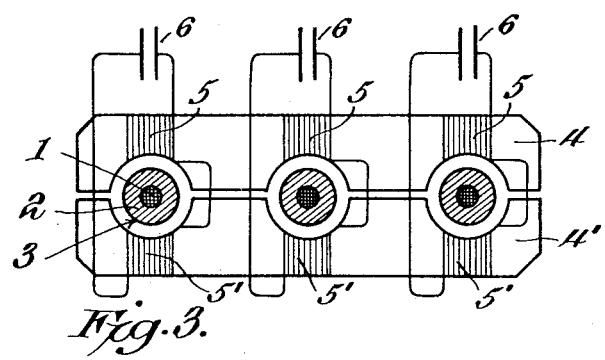
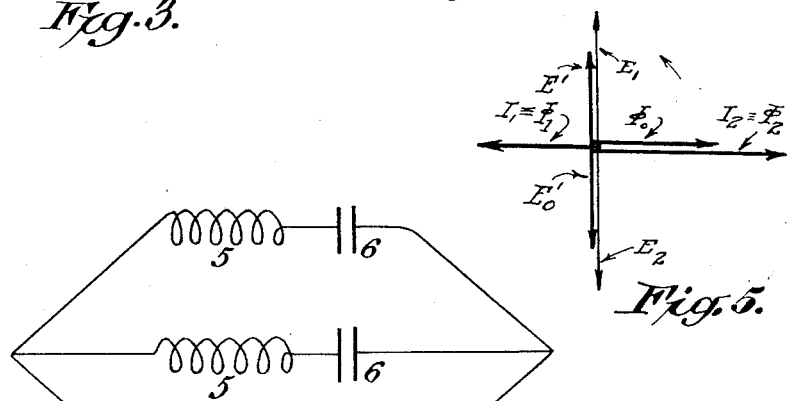
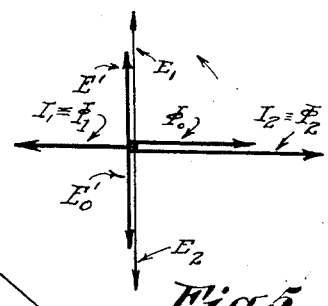
Inventor
Luigi Emanueli
By
Emil Bönnelycke
Attorney Patented Jan. 31, 1933

1,895,982

UNITED STATES PATENT OFFICE

LUIGI EMANUELI, OF MILAN, ITALY, ASSIGNOR TO SOCIETÁ ITALIANA PIRELLI, OF MILAN, ITALY

DEVICE FOR REDUCING THE CURRENT IN THE LEAD SHEATHS OF CABLES

Application filed February 14, 1930, Serial No. 428,469, and in Great Britain September 5, 1929.

This invention relates to electric cables, and has particular reference to devices for eliminating or reducing the losses in the metallic sheathing of single-core cables caused by induced sheath voltages or currents.

It is well known that in an alternating current system employing single-core cables sheathed with metallic envelopes such as the usual lead sheaths, electromotive forces are induced in the lead sheaths, and that if the sheaths are bonded together, losses occur due to currents flowing in the sheath circuits.

These losses are often considerable and in practice may reduce the current-carrying capacity of the cable by 20 per cent or more. Many methods have been tried to reduce these losses, such for example as the transposition of the sheaths to compensate or neutralize the linked flux, or such as the division of the sheaths into insulated sections connected together through resistances or inductances in order to reduce the current in the sheath circuits. These methods are not generally easy to apply, the more so when it is necessary to cut and insulate the metallic sheath.

The present invention has for its object to provide a method which will be free from the difficulties inherent in the methods heretofore proposed, and which can be easily applied to existing cable systems of the kind in question, and which will not necessitate any cutting of the metallic sheaths of the cables.

Considering the case of two single-conductor lead-sheathed cables laid side by side at a suitable distance apart to form a single-phase circuit for the transmission of electric power, it is well known that the flux linked with this circuit generates an electromotive force in the lead sheaths, and that current will flow in the sheaths if they are bonded together. The value of this current depends on the current in the conductor, the distance between the two cables, the dimensions of the cables and the resistance of the sheath circuits.

In order to create, at predetermined points along the cables, a flux opposite to the flux above-mentioned so as to neutralize the electromotive forces and thus reduce the currents in the lead sheaths of the cables when they are bonded, there is employed, according to the present invention, a transformer with a primary winding formed by the cable itself and completely surrounded by the iron core of the transformer, and with a secondary winding having connected across it an electrostatic condenser. Preferably the cable passes straight through the transformer, and the part of the cable which constitutes the primary winding of the transformer is considered as a "half-turn winding".

In order that this invention may be clearly understood and readily carried into effect, the same will be more fully described with reference to the accompanying drawing, in which:

Figure 1 shows a transformer applied to a single conductor cable;

Figs. 2 and 3 show the invention applied to a single-phase and to a three-phase line;

Fig. 4 shows the electrical connections utilized in a transformer for a three-phase line;

Fig. 5 is a vectorial diagram of the electromotive force, current and flux in a line constructed according to my invention.

In Fig. 1 the cable, represented by the conductor 1, the insulation 2 and the lead sheath 3, is surrounded by a magnetic core 4, 4' and by a secondary winding 5, 5' shunted across a suitable condenser 6; the conductor of the cable acting as a primary winding of the transformer. The magnetic core may, naturally, be divided into a certain number of parts, for instance the two parts 4, 4'. The secondary winding may also be formed by a certain number of parts, for instance 5 and 5'.

In a single-phase line, constituted by two single conductor cables laid one near the other, each of the single conductor cables may be supplied with a transformer which is independent of the other cable, or the transfomers of the two cables can be joined together in a single device, as shown in Fig. 2.

Fig. 3 shows how three transformers may be joined in a single device for a three-phase line. This figure refers to the case of three cables laid near one another and in the same plane. A similar arrangement may also be adopted when the cables have a triangle or delta arrangement. The three secondary windings may be completely independent one from another.

A further advantage may be obtained in a three-phase system by bonding the three secondary windings, as well as the three condensers, in a star connection, leaving the centers of the two stars separated and insulated, as shown diagrammatically in Fig. 4. With this connection the third harmonic is suppressed in the currents of the secondary windings, as may readily be seen by observing that the third harmonic has exactly the same phase in all three secondary circuits. It is also evident that the invention can be more generally applied to all kinds of transmission lines made with single-conductor cables, whatever the number of phases.

The theory of the invention will be explained with reference to Fig. 5. Let $I_1$ be the primary current (that is, the current in the cable conductor), $\phi_1$ the primary flux generated by this current, $I_2$ the current in the secondary winding of the transformer, $\phi_2$ the secondary flux generated by this current, $\phi_0$ the total flux resulting from the combination of the primary and secondary flux, and $E_1$ and $E_2$ the electromotive forces induced in the primary (that is, the conductor of the cable) and in each turn of the secondary winding of the cable, by said total flux.

The vectorial relations of these values between themselves are shown in Fig. 5, in which all the ohmic and magnetic losses have been neglected for simplicity. The current $I_2$ precedes the electromotive force $E_2$ due to the effect of the capacity of the condensers in the secondary circuit.

In the stretch of lead sheath surrounded by the transformer, an electromotive force $E'_0$ is induced by the total flux $\phi_0$, while in the other free stretch of lead sheath, where it is connected only with the flux $\phi_1$ generated by the current $I_1$ in the cable conductor, an electromotive force $E'$ is generated by this flux $\phi_1$, which is opposed to the electromotive force $E'_0$.

It is in this way possible to induce in the lead sheath an electromotive force opposite to that generated by the current flowing in the conductor of the cable so that this latter electromotive force can be totally or partially compensated. The current in the lead sheath will therefore be annulled or reduced.

It will be understood that, owing to the increased induction due to the concentration of the lines of force by the magnetic core of the transformer, an opposing electromotive force sufficient to neutralize that set up in a relatively long free length of cable, can be generated in a relative short length of cable adjacent the transformer.

By installing such devices in accordance with the present invention at appropriate distances apart, it is therefore possible to reduce or even to annul the sheath losses in any alternating current system employing single-core cables.

In the case of a failure or short-circuit occurring in the line, and the currents assume very high figures, the electromotive force in the secondary cannot exceed a certain value which is determined by the saturation of the magnetic core of the transformer, the condenser being in this way protected against the danger of puncturing.

Each transformer, or group of transformers, may be closed, together with the condensers, within a protective box filled with insulating material.

The cutting of the lead sheath is not necessary with the present invention; it can, therefore, be applied also to existing cables without changing anything in the cable installation.

I claim as my invention:—

1. A device for reducing the current in the sheath of a sheathed electric cable, comprising a plurality of transformers disposed along the cable at intervals without cutting the cable sheath, each transformer comprising a magnetic core surrounding the cable, a secondary winding on said core, and a condenser connected in series with said secondary winding, the conductor of the cable serving as the primary winding of the transformer, so that the electromotive force induced in the sheath by the current flowing through the cable conductor is neutralized at least partially by the electromotive force induced in the sheath of the cable by the transformers, the current in said sheath being consequently reduced.

2. A device as set forth in claim 1, applied to a three-phase system, in which there are a plurality of groups of three transformers each and in which the secondary windings of each group of transformers are bonded together in a star connection, the three condensers also being in star connection and each in series with its respective secondary winding.

3. The combination with an electric cable having a continuous metallic sheath, of means for reducing current losses in said sheath comprising a transformer having a magnetic core associated with said cable, a secondary winding on said core, and a condenser connected across the terminals of said secondary winding.

4. The combination with a cable for pulsating electric currents, said cable having a continuous metallic sheath, of means comprising induction and capacity elements for setting up, in each of certain portions of said sheath spaced at intervals therealong, an electromotive force opposed to that normally induced in said sheath by the current in the cable.

5. The method of reducing the effect of the electro-motive force normally induced in the continuous metallic sheaths of cables carrying pulsating electric currents, which method comprises generating in a portion of such a continuous sheath an electromotive force opposed at each instant to that set up in adjacent portions thereof by the current flowing in the cable.

6. The method of reducing currents normally induced in the continuous metallic sheaths of single conductor cables carrying pulsating electric currents when a plurality of such sheaths are bonded together, which method comprises utilizing the pulsating current itself to generate in a portion of such a continuous sheath an electromotive force opposed in each instant to that set up in adjacent portions thereof.

7. The method of reducing losses due to the electro-motive forces normally induced in the continuous metallic sheaths of cables carrying pulsating electric currents, which method comprises generating in such a continuous sheath, at a plurality of points spaced at suitable intervals therealong, electromotive forces opposed to those set up in the portions of the sheath between such points.

In testimony whereof, I affix my signature.

LUIGI EMANUELI.